Figure 1:
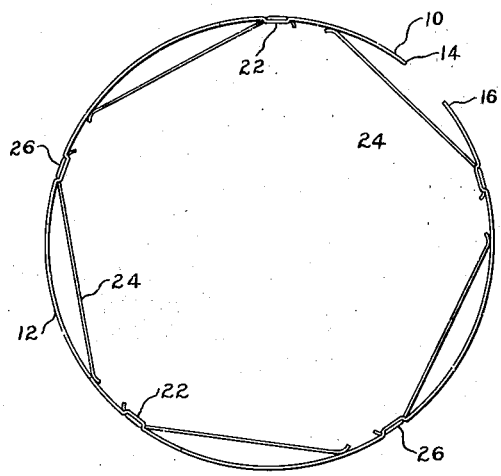

April 27, 1937.  F. A. LUTHY  2,078,395

PISTON RING EXPANDER

Filed April 20, 1936

Inventor
Fredrick A Luthy
By Beaman & Langford
Attorney

Patented Apr. 27, 1937

2,078,395

UNITED STATES PATENT OFFICE 2,078,395

PISTON RING EXPANDER

Fredrick A. Luthy, Jackson, Mich.

Application April 20, 1936, Serial No. 75,339

4 Claims. (Cl. 309—40)

The present invention relates to piston ring expanders for use in connection with the piston rings of internal combustion engines to increase the expanding action thereof to provide the proper pressure against the cylinder walls.

An object of the invention is to provide an expander for both oil and compression piston rings capable of exerting a more uniform and evenly distributed pressure against the piston ring than has been accomplished by expanders heretofore proposed.

Another object is to provide an expander for piston rings in which a plurality of individual circumferentially spaced springs act through an intermediate ring or band.

A further object is to provide an expander of the type described in which a plurality of spring members are supported from a carrier upon the inside thereof and act upon the piston ring indirectly through the carrier.

A still further object of the invention resides in an expander of the type described in which the pressure exerted by a resilient member is transmitted through an intermediate member to the piston ring for the proper distribution of the pressure of the cylinder wall.

These and other objects and advantages residing in the construction and combination and arrangement of the parts will become apparent from the following detailed description and the annexed claims in which the invention is clearly set forth.

Figure 3:
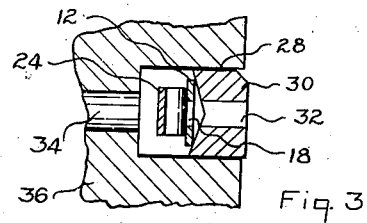
Figure 5:
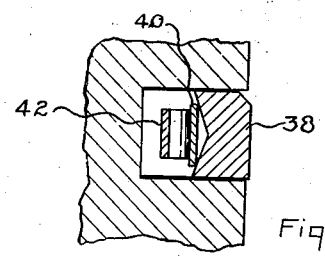
Figure 2:
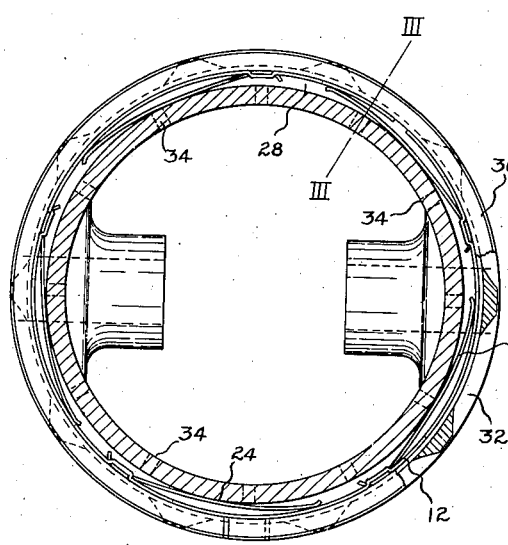
Figure 4:
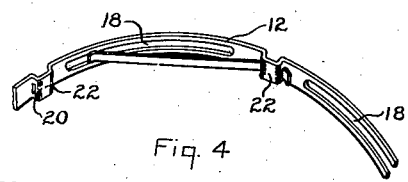
Figure 8:
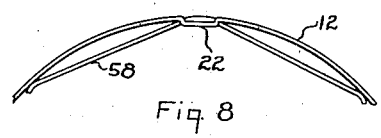
Figure 7:
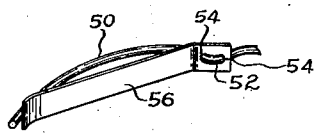
Figure 6:
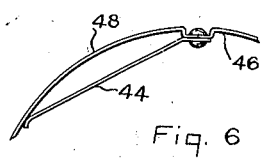

In the drawing,

Fig. 1 is a plan view of the expander,

Fig. 2 is a cross-sectional view taken through a groove of the piston showing the expander assembled therein and acting upon an oil ring, Fig. 3 is a cross-sectional view taken on line III—III of Fig. 1, Fig. 4 is a fragmentary perspective view of the expander showing one of the spring members removed for the sake of clarity, Fig. 5 is a cross-sectional view similar to Fig. 3 of an expander used in connection with a compression ring, and Figs. 6, 7, and 8 are fragmentary plan views of modified forms of expanders embodying the present invention.

In Figs. 1 and 4 my improved expander ring 10 is shown as consisting of a carrier ring or band 12, which is preferably in the form of a single split ring, the opposite ends being designated as 14 and 16. The carrier ring 12 may be of spring steel stock and prior to heat treatment and shaping is punched to provide longitudinally extending slots 18 and transverse slots 20 and formed to provide offsets 22 which bring adjacent pairs of slots 20 into opposed relation and alignment. Spring steel members 24 are fixed at the ends 26 to the carrier ring 12 by threading the ends thereof through the aligned slots 20. The opposite ends of the members 24 are free to slide along the inside of the ring 12 upon shortening due to deflection of the center portion of the members 22 by engagement with the bottom of the piston groove 28 as shown in Fig. 2. As illustrated, intermediate its ends each spring member 24 is straight and constitutes a cord of the cylinder defined by the ring 12. In practice, however, it may be found advantageous in some cases to form the members 24 along curvilinear lines such as for example the portions between the ends may be inwardly arched. The ends 26 are of a shape placing the same under stress upon being threaded through the slots 20 so as to frictionally hold the spring members 24 into position. Preferably the extent of the offsets 22 is only sufficient to bring the outside of the ends 26 flush with or slightly inward of the outer periphery of the ring 12 so that the outside of the ring 12 may be free of my protuberances and may engage with the inner side of the piston ring throughout substantially its entire circumference.

In Fig. 3, which is a section taken on the line III—III of Fig. 1, the oil ring 30 is ported at 32 in a well known manner with which the slot 18 in the carrier ring 12 are aligned for free passage of oil around the spring member 24 and through the port 34 in the piston 36. The oil ring 30 is shown with a V-grooved inner side as disclosed in my co-pending application Serial No. 73,631, filed April 10, 1936, so that the expander 10 is self-centered. However, my improved expander can be used with other types of oil rings in which case, for the most part, the width of the carrier ring 12 will be substantially equal to that of the ring groove so as to assure alignment of the slots 18 with the ports 32. As will appear from Fig. 3, the spring member 24 is of substantially less width than the ring groove 28 so as to provide plenty of clearance above and below for the passage of oil to the port 34.

As will be understood, my improved expander is equally adaptable to compression rings as well as oil rings. In Fig. 5 is shown a section similar to that in Fig. 3 in which the expander is used in connection with a compression ring 38. The carrier ring or band 40 obviously need not be provided with the slots 18 although the same expander may be used for both oil and compression rings. The spring member 42 is supported in the carrier ring 40 in the same manner as shown in Fig. 1.

In Fig. 6 is shown a modification in which the spring member 44 is riveted to the offset 46 of the carrier ring 48 in lieu of the method shown in detail in Fig. 4. A further modification is shown in Fig. 7 in which the carrier 50 may be in the form of a relatively small circular or flat wire which has an offset portion 52 threaded through spaced openings 54 of the spring member 56. This particular construction is more adaptable to compression rings than oil rings although it may be used in connection with the latter where it is of less width or when in position is not imposed over the ports of the oil ring. Fig. 8 is a still further modification of the invention showing the carrier 12 provided with a double ended spring member 58 having the center portion thereof threaded through the slots 29 of the offset portion 22. This particular construction has the advantage that it provides for a larger number of spring members about the inner circumference of the carrier and has a minimum reducing effect upon the diameter between the cords defined by the spring members which enables the expander to be inserted into the piston ring groove with a minimum amount of expansion of the carrier 12 and enables the expander to contract further into the ring groove before engagement between the springs 58 and the bottom of the ring groove is encountered.

In each of the forms of the invention herein illustrated it should be apparent to those skilled in the art that the radial action of each of the springs 24 due to deflection at the center portion thereof is equally distributed between the fixed and free ends of the springs and is transmitted to the carrier ring 12 and distributed along substantial arcs of the carrier and hence more uniformly applied along the inner circumference of the piston ring. In this manner a more uniform distribution of the expanding action of the expander is applied against the piston ring than is possible in devices heretofore proposed in which individual spring elements of a carrier have localized pressure contact with circumferentially spaced points along the inside of the piston ring. Also in such prior constructions the individual springs for effecting the expanding action have been of a cantilever type, whereas I have found it more advantageous to so design the spring members 24 as to obtain a deflection and reaction which might be compared with that of an elliptic spring.

I am fully aware of the expander construction disclosed in United States patent to McGinniss, No. 1,348,953, and the present invention is considered to be an improvement thereover. In this respect in my construction the carrier band may be fabricated from inexpensive stock as the resiliency of the same is not relied upon for the expanding action; the individual springs 24 being fabricated from more expensive spring steel stock and heat treated to give the required expanding action indirectly applied to the piston ring through the carrier band.

While in the preferred forms of the invention herein illustrated is shown the carrier as being of one piece construction and substantially circular, it is anticipated that the carrier may be made up of two or more separate and disconnected sections having one or more spring members associated with each section. In such a construction and sections of the expander would be assembled directly into the piston groove without the necessity of expanding and would be held in position by the piston ring.

Having described my invention what I desire to protect by Letters Patent and claim is:

1. An expander for piston rings comprising an outer band having circumferentially spaced radially inwardly extending offset portions, opposed aligned slots defined in said offset portions, and spring members disposed along the inner circumference of said band and connected to said band by being received in said slots.

2. A narrow expander for use in back of piston rings of the pistons of internal combustion engines comprising a thin circular carrier band adapted when placed within the piston ring to engage with the inner circumference thereof throughout substantially the entire extent, a plurality of thin flat springs attached at one end to the inner side of said carrier and having relatively straight portions extending from said points of attachment in the manner of chords and terminating in free ends adjacent the point of attaching of the next spring, said straight portions being of sufficient length that the radial distance from the center of said carrier to the central part of said straight portions is less than the radial distance from the center of said piston to the bottom of the piston ring groove whereby when in use said springs are bowed outwardly through contact between said central part of said straight portions and said groove.

3. An expander according to claim 2 in which said carrier has inwardly extending offset portions to which said flat springs are attached.

4. An expander according to claim 2 in which said carrier has inwardly extending offset portions, rivets attaching said flat springs to said offset portions, the heads of said rivets being substantially flush with the outer surface of said carrier.

FREDRICK A. LUTHY.